United States Patent [19]
Schmidt

[11] Patent Number: 5,841,514
[45] Date of Patent: Nov. 24, 1998

[54] FILM ADVANCE MECHANISM FOR MOTION PICTURE APPARATUS

[75] Inventor: Leland R. Schmidt, Simi Valley, Calif.

[73] Assignee: Iwerks Entertainment, Inc., Burbank, Calif.

[21] Appl. No.: 835,095

[22] Filed: Apr. 4, 1997

Related U.S. Application Data

[63] Continuation-in-part of Ser. No. 518,463, Aug. 23, 1995, Pat. No. 5,633,696, which is a continuation-in-part of Ser. No. 250,055, May 27, 1994, abandoned, which is a continuation of Ser. No. 4,511, Jan. 14, 1993, Pat. No. 5,341,182.

[51] Int. Cl.[6] .............................. G03B 1/00; G03B 1/52
[52] U.S. Cl. .......................... 352/184; 352/222; 352/225
[58] Field of Search .................................. 352/184, 159, 352/185, 221, 222, 225, 166

[56] References Cited

U.S. PATENT DOCUMENTS

| | | | |
|---|---|---|---|
| 1,299,469 | 4/1919 | Holmes | 226/87 |
| 2,747,457 | 5/1956 | Wengel | 88/18 |
| 3,007,368 | 11/1961 | Rosenbaum | 88/18 |
| 3,065,890 | 11/1962 | Fox | 226/36 |
| 3,135,159 | 6/1964 | Fabregat et al. | 88/18 |
| 3,214,233 | 10/1965 | Persidsky | 352/184 |
| 3,236,580 | 2/1966 | Zahn | 352/185 |
| 3,397,827 | 8/1968 | Heisler | 226/59 |
| 3,512,693 | 5/1970 | Utsumi | 226/54 |
| 3,600,073 | 8/1971 | Shaw | 352/184 |
| 4,009,949 | 3/1977 | Nupnau | 352/159 |
| 4,039,256 | 8/1977 | Teeple, Jr. et al. | 352/184 |
| 4,114,996 | 9/1978 | Shaw | 352/184 |
| 4,206,981 | 6/1980 | Ozaki et al. | 352/14 |
| 4,420,231 | 12/1983 | Gottschalk | 352/142 |
| 4,441,796 | 4/1984 | Shaw | 352/184 |
| 4,477,160 | 10/1984 | Trumball | 352/40 |
| 4,522,476 | 6/1985 | Renold | 352/225 |
| 4,560,260 | 12/1985 | Trumball | 352/40 |
| 4,697,896 | 10/1987 | Fox | 352/180 |
| 4,835,555 | 5/1989 | Maxwell | 352/225 |
| 5,266,979 | 11/1993 | Brown et al. | 352/224 |
| 5,341,182 | 8/1994 | Schmidt | 352/184 |
| 5,633,696 | 5/1997 | Schmidt | 352/184 |

FOREIGN PATENT DOCUMENTS

| | | |
|---|---|---|
| 279328A1 | 5/1990 | Germany . |
| 1417758 | 3/1973 | United Kingdom . |

OTHER PUBLICATIONS

Pioneer Corporation Pacer–35 35 mm Projection System data sheet (no date).
Two photographs of Pacer–35 motion picture projector (no date).
Article entitled "Cosmos—A New Video Look" from *American Cinematographer* (Oct. 1990), pp. 1022–1023.

*Primary Examiner*—Russell E. Adams
*Attorney, Agent, or Firm*—Christie, Parker & Hale, LLP

[57] ABSTRACT

A motion picture apparatus and method for intermittently advancing motion picture film by forced air. The film is initially placed into successive loops formed by a cam-driven flipper. The loops and thus the film are advanced through the projector or camera pathway by a forced air blower which propels the successive loops through a projection pathway. Vacuum pressure may also be applied to the film through a gate to secure the film to the gate with linearly arranged register pins steadying the film over a projection aperture. The film is rewound through the projector by a motorized rewind with a positive pressure applied to the film through the gate.

8 Claims, 9 Drawing Sheets

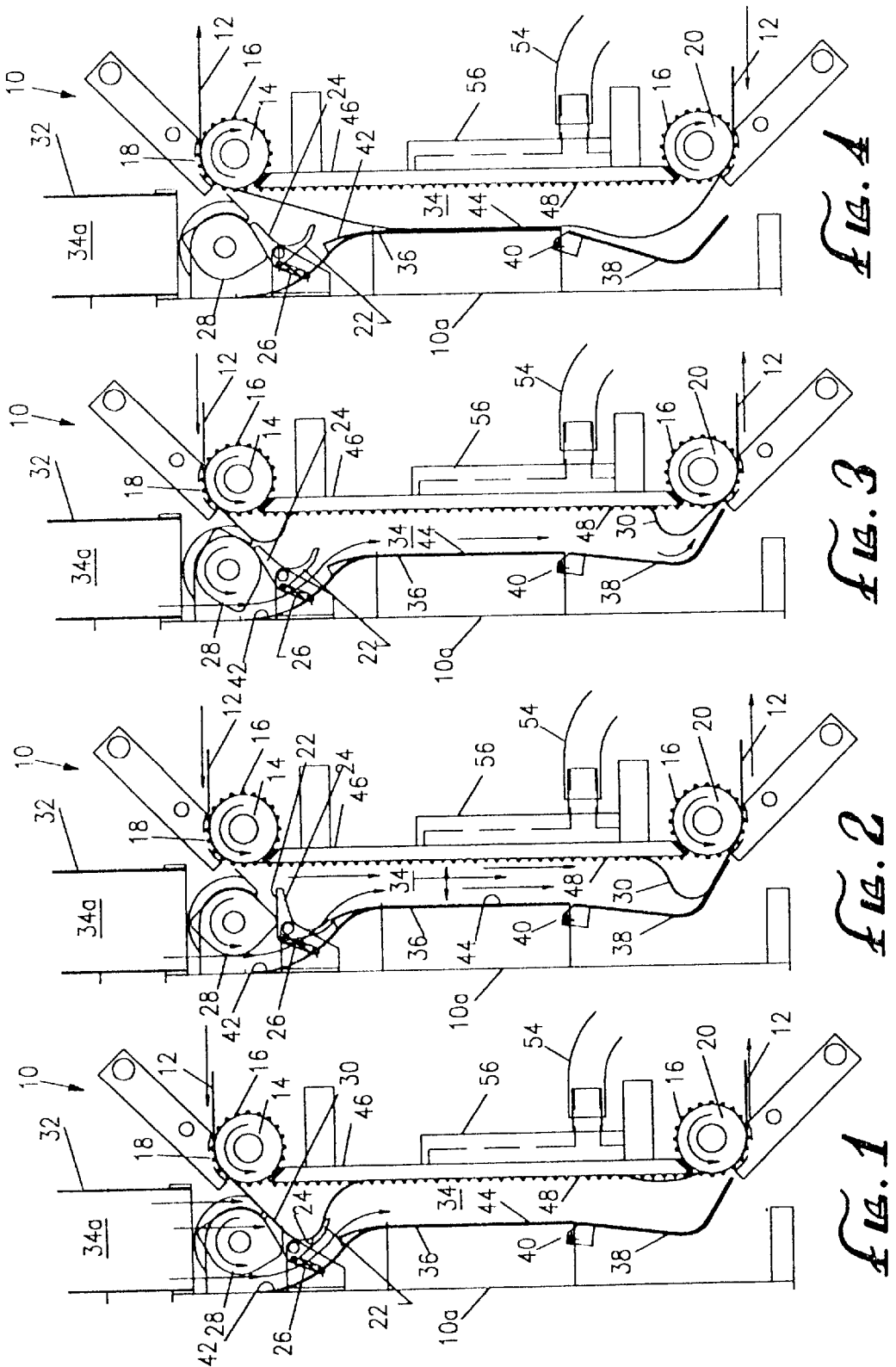

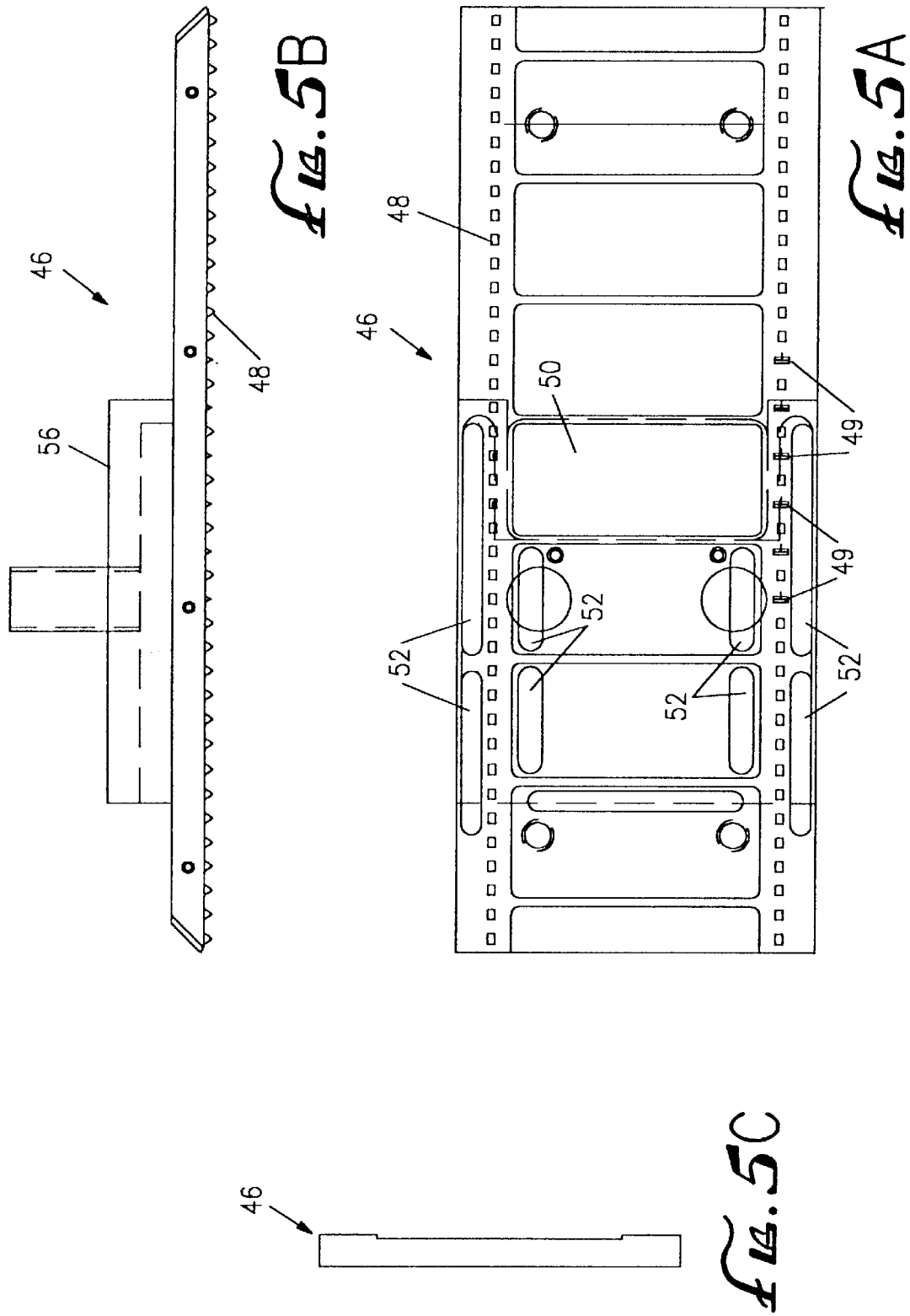

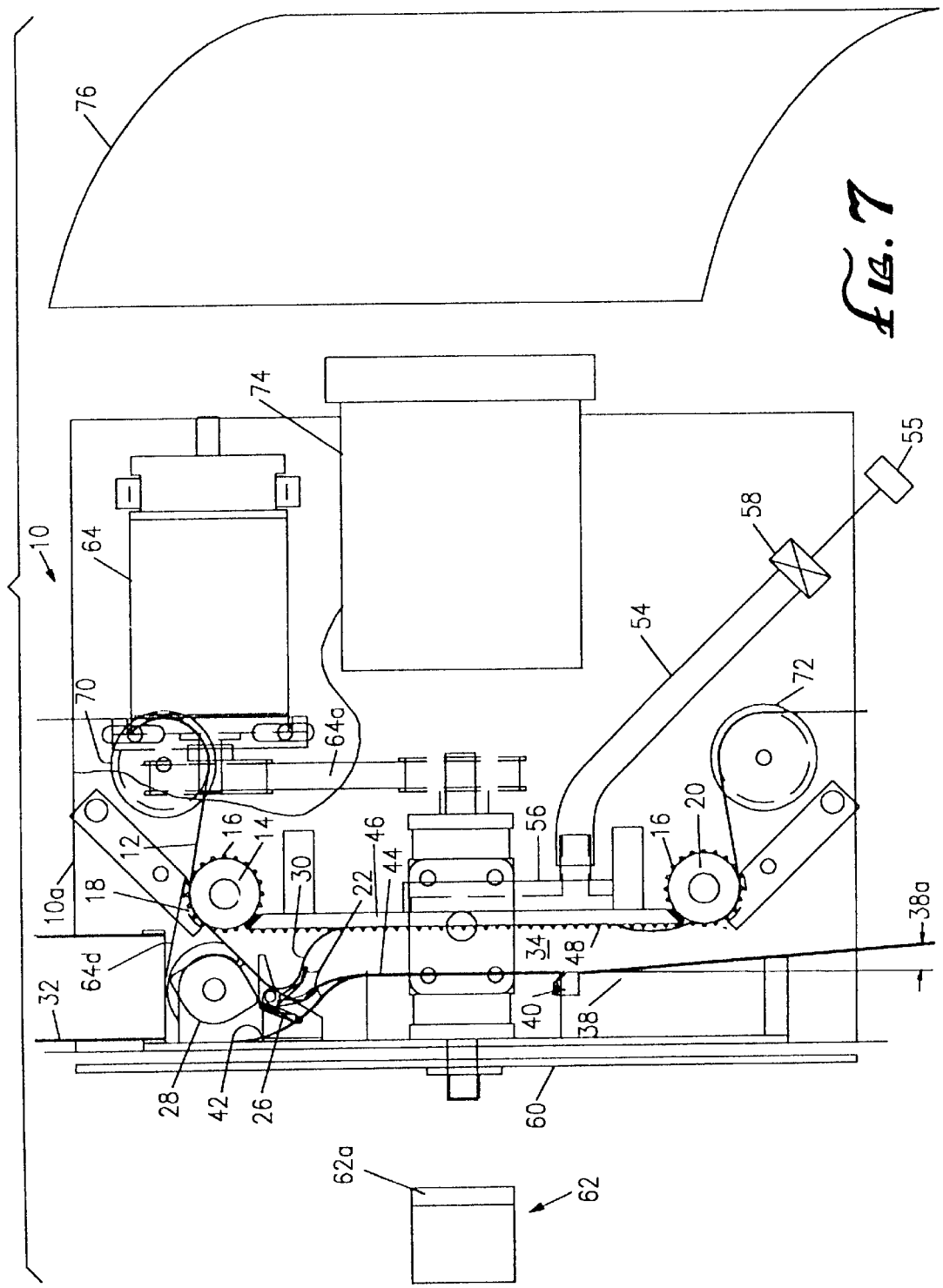

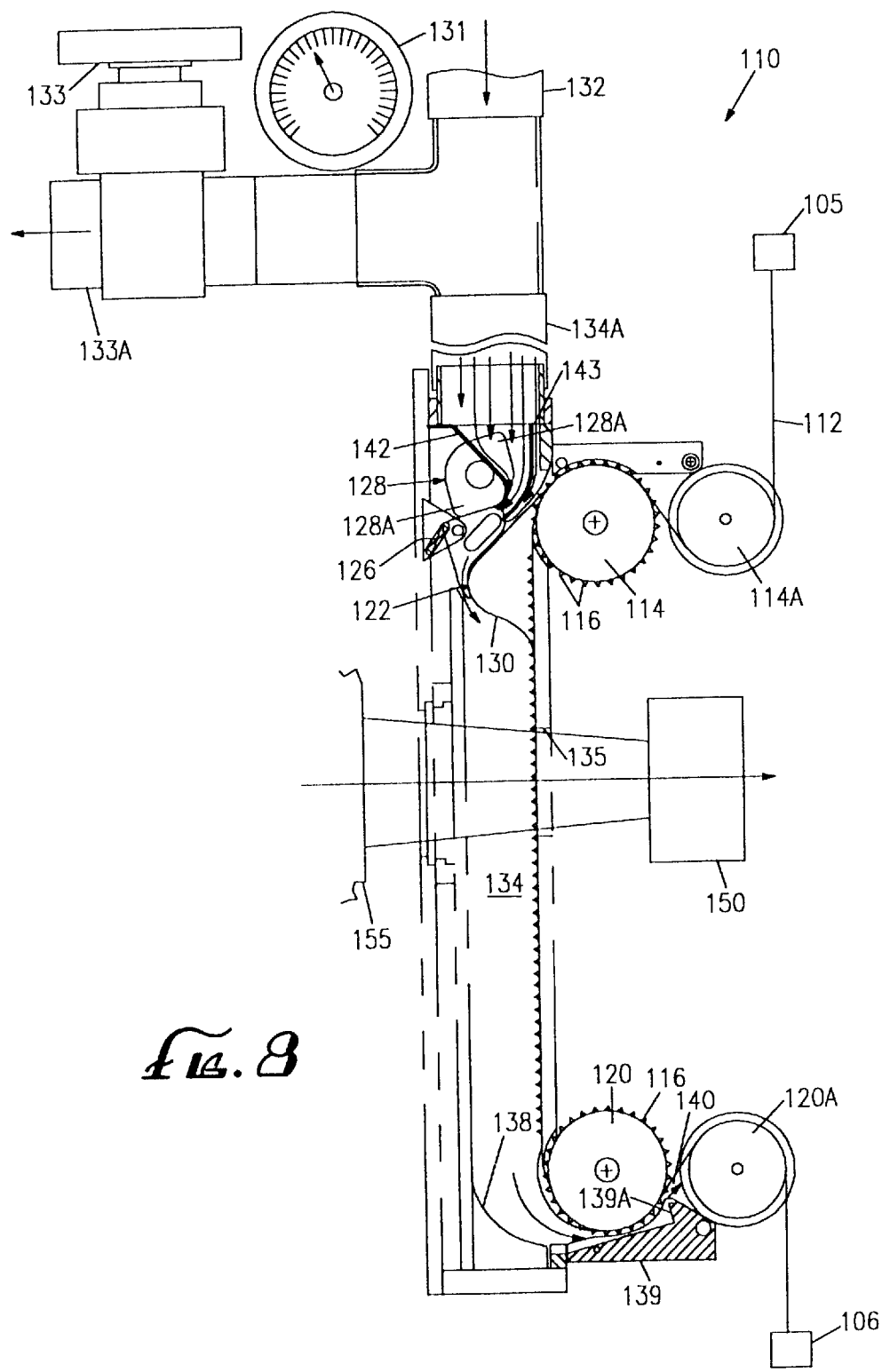

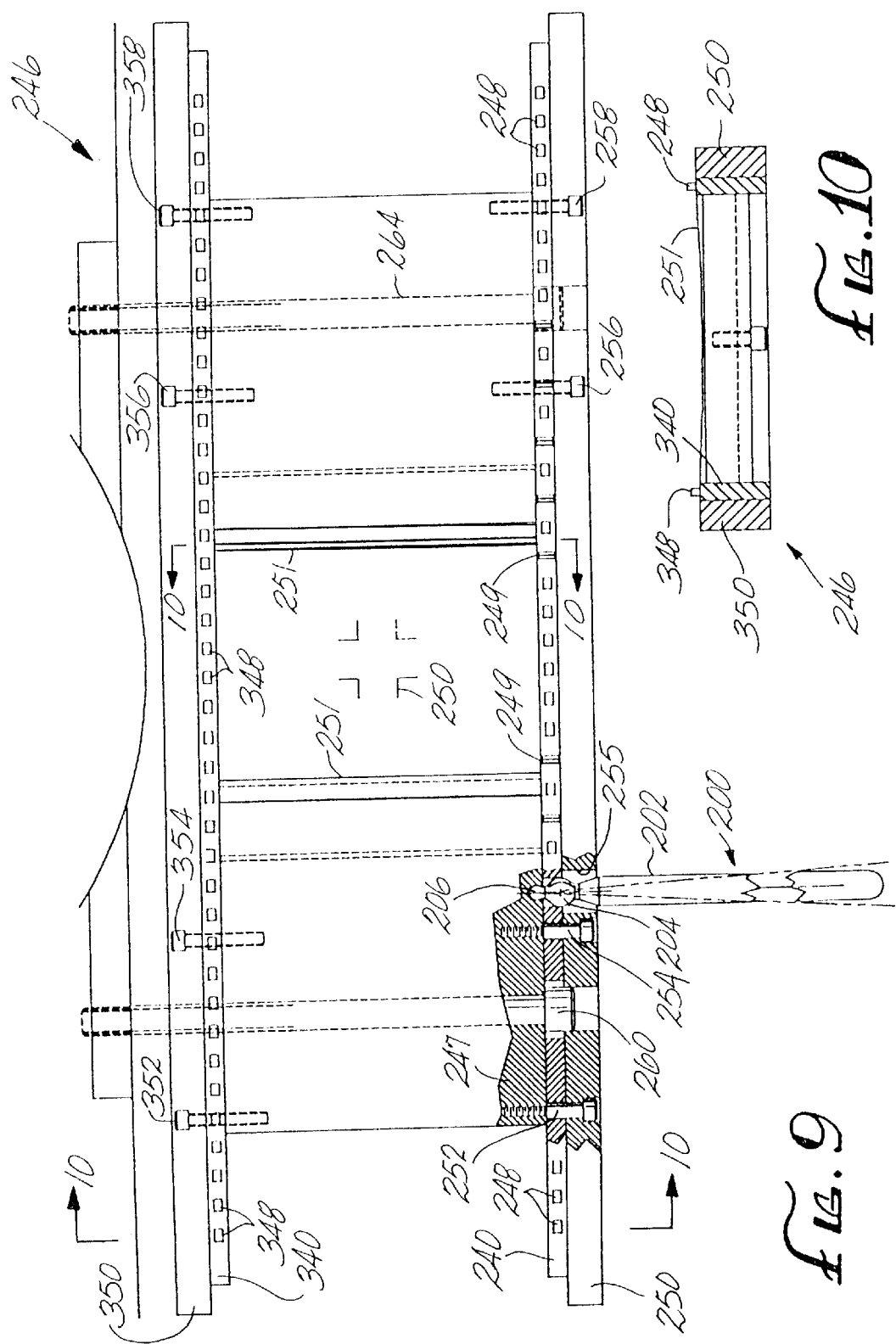

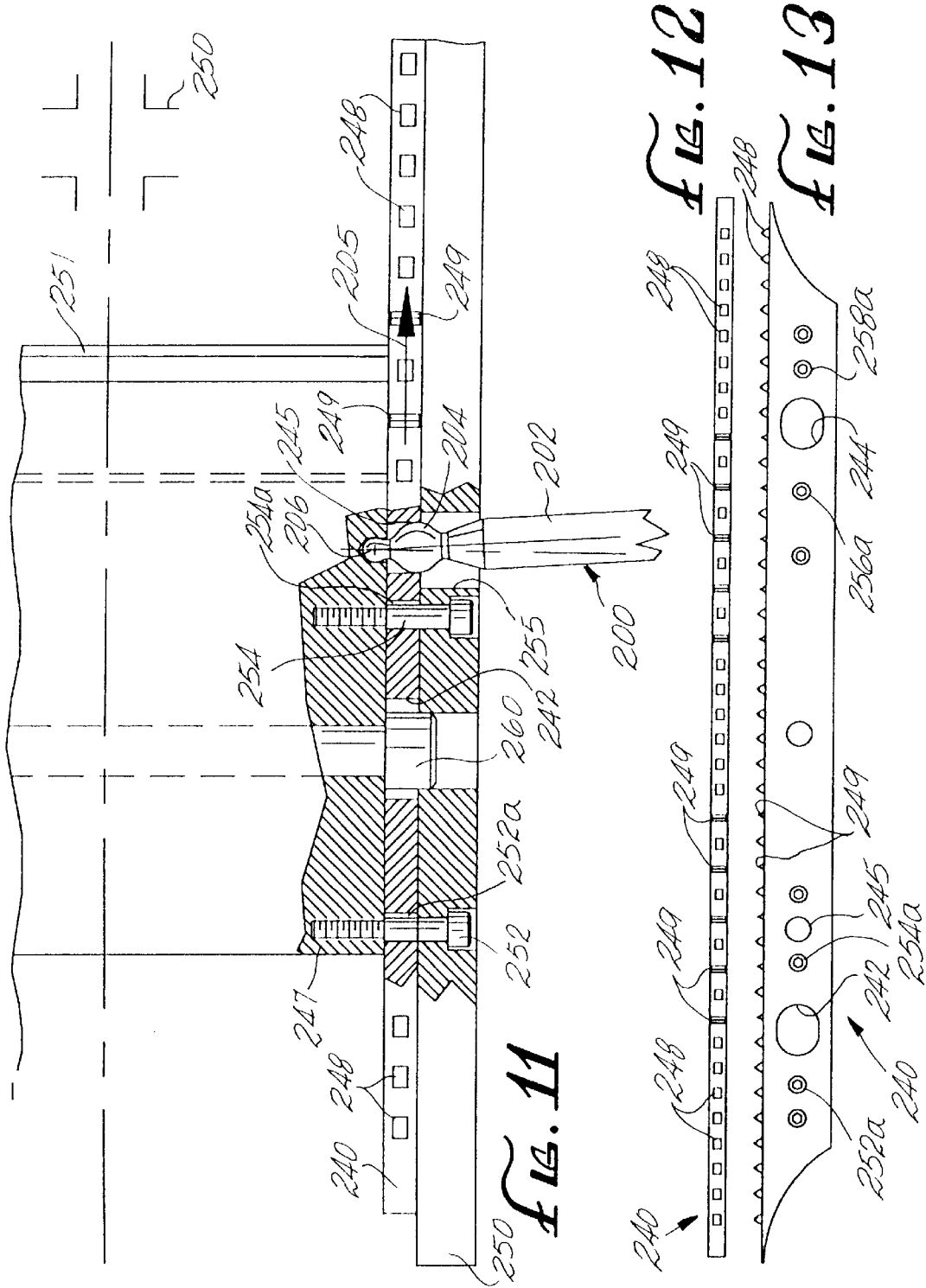

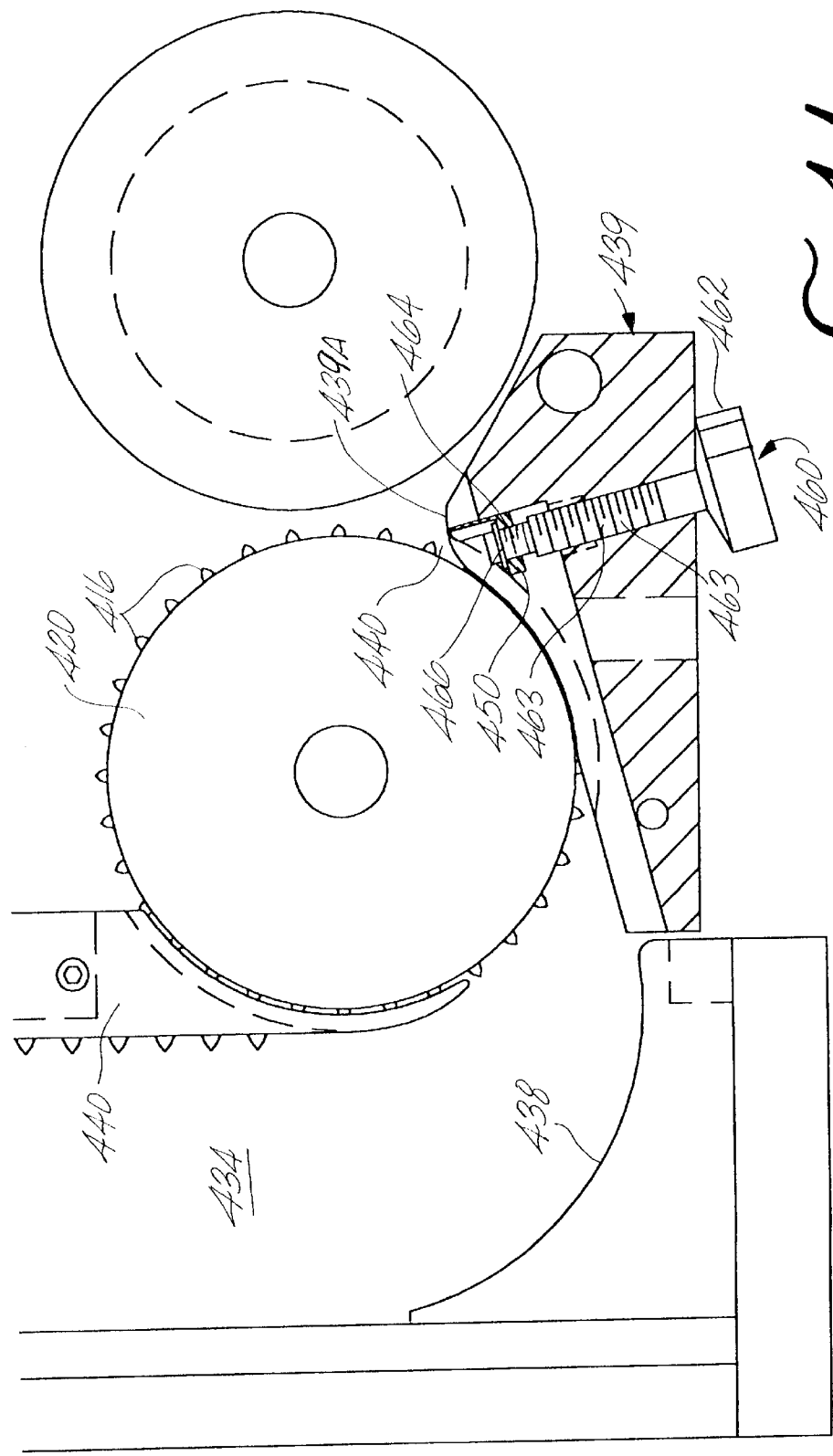

FILM ADVANCE MECHANISM FOR MOTION PICTURE APPARATUS

This application is a continuation-in-part of application Ser. No. 08/518,463 filed Aug. 23, 1995 now Pat. No. 56336096 which is a continuation-in-part of application Ser. No. 08/250,055 filed May 27, 1994 now abandoned which in turn is a continuation of application Ser. No. 08/004,511 filed on Jan. 14, 1993 now U.S. Pat. No. 5,341,182.

The field of the present invention relates to film advance mechanisms such as motion picture projection and photography systems. Motion picture projectors have been utilized in a variety of situations in addition to their familiar use in movie theaters. Thrill rides at theme parks utilize motion picture projectors to simulate surroundings and enhance the true to life look and feel of a particular ride. Planetarium projectors are used to project realistic images onto a large, domed projection screen.

These conventional projectors have numerous mechanical and electrical components to control film speed, film placement and the particularly difficult task of rewinding the film. Accordingly, the conventional projectors often develop operational problems requiring frequent maintenance and repair work. These problems idle the particular projector and may even shut down the theater or thrill ride. Conventional motion picture projectors may also employ computer actuated controls, requiring additional operator skills to maintain and repair.

In its preferred embodiment, the present invention comprises a projector design which eliminates numerous mechanical and electrical components by using a directed flow of air to propel film through the projector.

In a preferred configuration for the film advance drive, motion picture film enters the projector housing by an input sprocket having sprocket teeth which mesh with perforated openings along a length of the film. A similar output sprocket takes up the film at the outlet side. The film advance drive utilizes a flipper having a crescent shaped or curved surface to place a series of loops into the motion picture film. The flipper has been biased by a spring so that this surface on the flipper mates with the film. A cam contacts the flipper to cause the flipper to pivot repeatedly to sequentially form and release the loops, thereby intermittently advancing the film along a projection pathway. To advance the film, the sequential barrage of loops is propelled by the air flow from a multi-stage air blower along the film's path.

An air foil may form one side of the film's projection pathway. A rotatable guide member is secured to the lower end of the air foil by a hinge so the guide member can pivot about the air foil and direct the loop to facilitate film supply or film rewind. The air foil is comprised of first curved surfaces and second planar surfaces that span from near the air blower to the outlet.

Positioned opposite the air foil is the gate which, in this embodiment, spans between the input sprocket and the output sprocket. Two rows of register pins are arranged in pairs along the gate in a substantially linear fashion to engage the paired perforated openings on the film and secure the film over a projection aperture. A feature includes a few register pins with a wider transverse dimension to reduce unwanted sideways motion of the film. A vacuum may be applied to secure the film to the gate during film advancement while positive pressure may be applied to the film during the rewinding operation to keep the film off the gate and speed up the rewind process.

Another feature utilizes a single multi-speed motor which is coupled to the various moving parts by different couplers, including the shutter, the cam and the film input and take-up drivers allowing synchronized operation of the projector. An encoder may also be used to accurately control film speed and film positioning. Because of the relatively small number of parts, this film advance drive is easier to operate and maintain requiring no extensive computer software nor other expensive parts to service. The resulting projector may have the added advantage of cooling the film during operation of the projector. Film rewind is also easily accomplished.

The film advance drive may also be provided with fine adjustment mechanisms to further ensure precise film registration and facilitate smooth film advance.

Accordingly, it is an object of the present invention to provide a motion picture apparatus and film advance drive, but other and more detailed objects and advantages will appear to those skilled in the art from the following description and the accompanying drawings, wherein:

FIG. 1 is a side cut-away view of a preferred embodiment of the present invention illustrating the direction of movement of the film with arrows indicating the respective rotational directions of the cam and sprockets.

FIG. 2 is a side cut-away view taken later in time compared to FIG. 1 illustrating the direction of the loop and air flow (with arrows) through the motion picture projector.

FIG. 3 is also a side cut-away view of the present invention showing the sequential movement of the loop in the film from its position in FIG. 2 and showing (with arrows) the flow of air.

FIG. 4 is another side cut-away view illustrating the motion picture apparatus rewinding the film with arrows showing the rotational direction of the sprockets.

FIG. 5A is a top view of the gate that temporarily secures or registers the film between the film input and the film output.

FIG. 5B is a side elevation view of the gate.

FIG. 5C is an elevation view from another side of the gate.

FIG. 7 is another side view of the present invention showing two positions of the flipper and illustrating the projection lens, a cut-away view of the motor and schematically illustrating the light source.

FIG. 8 illustrates an alternate projector embodiment.

FIG. 9 is a plan view in partial cross section of the adjustment mechanism for the row of register pins.

FIG. 10 is a cross sectional view of FIG. 9 taken along line 9—9.

FIG. 11 is detailed view in partial cross section of the adjustment mechanism for the row of register pins with the row adjusted in one direction.

FIG. 12 is a top plan view of the row of register pins.

FIG. 13 is a side elevation view of the row of register pins of FIG. 12.

FIG. 14 is a side elevation view of the adjustment mechanism for the film takeup guide.

Figure 6:
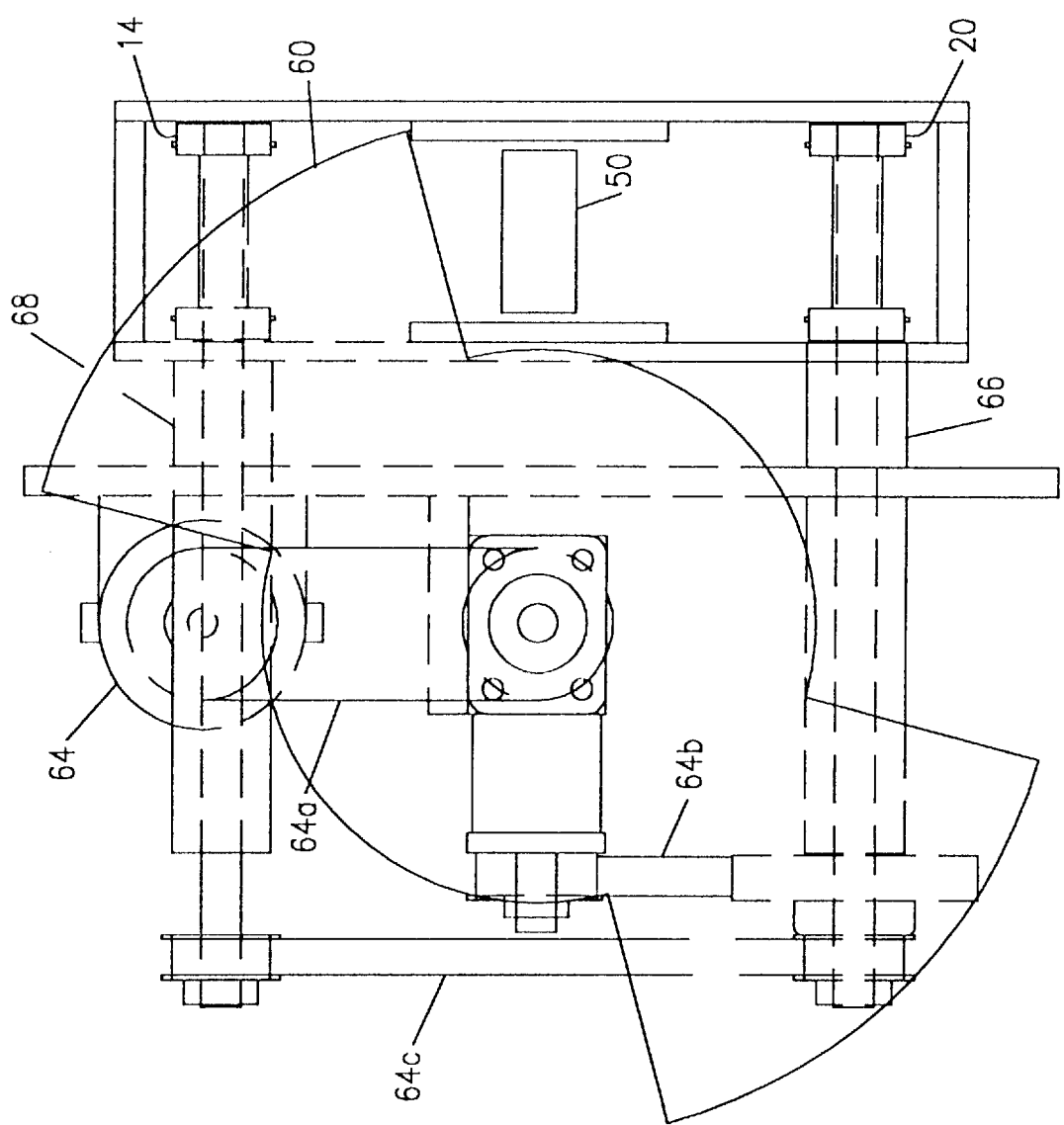
FIG. 6 is a rear elevation view of one embodiment of the present invention illustrating the position of the shutter, a multi-speed motor and the coupling of the motor to the shutter and the input and output sprockets.
Figure 15:
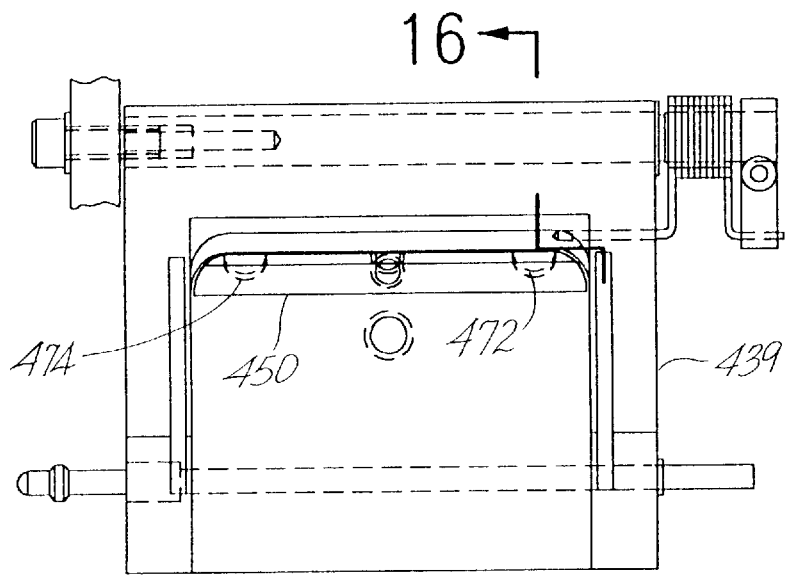
FIG. 15 is a plan view of the adjustment mechanism of FIG. 14.
Figure 16:
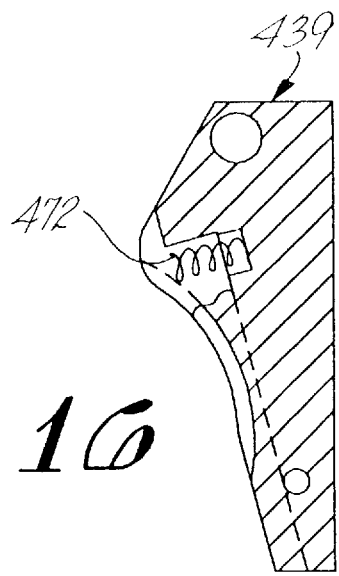
FIG. 16 is a cross sectional view of FIG. 15 taken along line 16—16.
Figure 17:
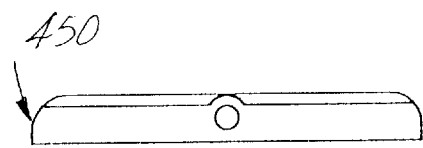
FIG. 17 is a plan view of the slide bar.
Figure 18:
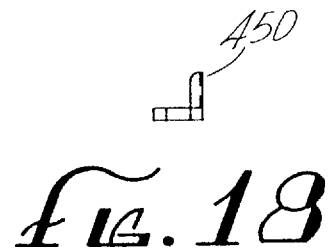
FIG. 18 is a side elevation view of the slide bar of FIG. 17.

Referring now to the figures, FIG. 1 illustrates the motion picture apparatus 10 and a portion of the support housing 10a. As shown initially in FIG. 1, the motion picture film 12 enters the housing 10a by a cylindrical input sprocket 14. Sprocket teeth 16 on the sprocket 14 mesh with perforated openings 18 paired at regular intervals along the length of the film 14. At another end of the housing 10a, the film 12 is taken up by a cylindrical output sprocket 20 also having sprocket teeth 16 on the circumference of the sprocket 20.

The film 12 next engages the flipper 22 which, in this embodiment, has a crescent shaped surface 24 feature to engage the film 12. A spring 26 biases the flipper 22 so that the surface 24 contacts the film 12 after the film 12 enters the housing 10a. As shown in FIG. 1, a cam 28 is positioned directly above the flipper 22. As the cam 28 is rotated, its surfaces strike the flipper 22 to actuate up and down movement of the flipper 22 as shown later in sequence in FIGS. 2 and 3. The flipper 22 thereby places a loop 30 in the film 12 as illustrated in FIG. 1.

A multi-stage air blower 32, shown schematically in FIGS. 1–4, is placed above the cam 28 to force air out through the blower exit 34a downward past the cam 28 and the flipper 22. In one feature, the air blower 32 may be a Rotron blower model no. SL2P2 which is adjusted to input an air pressure equivalent to approximately fifteen inches of water. An alternate air pressure adjustment mechanism may be employed such as a pressure controller as disclosed in the embodiment of FIG. 8 below. As the film 12 is advanced, a series of loops 30 (and thus the film 12) is propelled along a first pathway 34 by air pressure from the air blower 32 as shown in FIGS. 2 and 3 illustrating the sequential movement of a loop 30.

The speed and size of the loop may be selected depending upon the size, speed and type of film but is generally selected such that the film is advanced one frame by the travel of a loop 30 from its position adjacent flipper 22 (as shown in FIG. 1) and its position adjacent the output sprocket 20 (as shown in FIG. 2). In sequence, (1) with the shutter closed the film is advanced one frame by the travel of one loop from the positions illustrated from FIG. 1 to FIG. 2, (2) with the frame in position, the shutter is opened and film exposed, and (3) the shutter is closed and another loop is passed to advance the film one frame (repeating the process).

Spanning from just adjacent to the blower exit 34a past the flipper 22 is the air foil 36 which forms one side of the first pathway 34. A guide member 38 is secured to the lower end of the air foil 36 by a hinge 40 so the guide member 38 can pivot about the air foil 36 to facilitate the film supply operation or a film rewind operation. The guide member 38 may be "L" shaped as shown in FIGS. 1–4 or may be substantially straight. The air foil 36 is comprised of first curved surfaces 42 starting below the blower 32, the cam 28 and the flipper 22 and is comprised of second planar surfaces 44 along a span of the first pathway 34.

Positioned opposite the air foil 36 is the gate 46 which, in this embodiment, spans between the input sprocket 14 and the output sprocket 20 as shown in FIGS. 1–4. FIGS. 5A and 5C shows the gate 46 has substantially planar surfaces where it mates with the film 12. Two rows of register pins 48 are arranged in a linear fashion along the gate 46 so that pairs of register pins 48 engage the paired perforated openings 18 on the film 12 and securing the film 12 over the projection aperture 50. As shown in FIG. 5A, some register pins 48 have a wider transverse dimension 49 to reduce unwanted sideways motion of the film 12 that causes unwanted flutter of the projected picture.

A plurality of ports 52 are arranged on the gate 46 so that a pressure may be applied to the film 12 through a pressure input line 54 connected to a Rotron blower model no. RDC12HF which supplies the pressure. A jacket 56 surrounds the ports 52 and distributes the pressure to the ports 52. This pressure may be changed from a vacuum pressure to a positive pressure through a switching valve 58, shown schematically in FIG. 7. A vacuum pressure equivalent to ten inches of water has been found to be sufficient to secure the film 12 to the gate 46.

During film advancement, the loops 30 span between the air foil 36 and the gate 46 with a portion of the film 12 over the aperture 50 so that the flow of air from the blower 32 propels the loop 30, in effect forcing the loop 30 through the first pathway 34. Using 70 millimeter film with five perforation advance, a distance of approximately $13/16$ of an inch between planar surfaces 44 and the gate 46 is used. The film speed or frame rate can be adjusted to accommodate frame rates of 24, 30, 48 or 60 frames per second.

The guide member 38 may be pivoted toward the gate 34 or pivoted away from the gate 34 as required for film advancement or film rewind. As shown in FIG. 7, a rotated angle 38a of the guide means 38 of between zero degrees and ten degrees is used to provide a path for advancement of the film 12 toward the output sprocket 20.

Another feature is shown in FIG. 6, where the multi-speed motor 64 is illustrated with various couplers 64a, 64b and 64c. One feature uses a Torque Systems DC motor model no. MT 3630131AF and may include an encoder to accurately control the operation speed of the apparatus 10. The motor 64 is coupled to the shutter 60 by a first coupler 64a to provide intermittent illumination of the film 12. A second coupler 64b couples the motor 64 to an output driver 66 to transport film 12 from the output sprocket 20. A third coupler 64c couples the output driver 66 to the input driver 68 to transport film 12 from the input sprocket 14. The output driver 66 and the input driver 68 may each employ a clutch mechanism to allow smooth film 12 advancement or rewind.

Referring again to FIG. 7, a fourth coupler 64d is shown coupled to the cam 28 which allows the motor 64 to also propel the cam 28. The light source 62 and first lens 62a, which initially focuses the light onto the film 12, are shown schematically. The input spooler 70 and the output spooler 72, coupled to the film 12, are shown adjacent to the input and output sprockets 14 and 20 respectively for transporting film into or away from the sprockets 14 and 20. The projection lens 74 which projects the illuminated motion picture onto a screen is shown in its preferred location on the housing 10a.

FIG. 8 illustrates an alternate embodiment for a motion picture apparatus 110. With certain difference as noted below, the motion picture apparatus 110 is similar to the motion picture apparatus 10 of FIG. 1. The film 112 is moved past aperture 135. Light from lamp 155 is passed through the film 112 with the projected image focused by lens 150.

In this embodiment, input pressure from blower 132 is controlled by a pressure control valve 133 which bleeds off pressure through an exit line 133a. A film loop 130 is formed in the curved portion of the flipper 122, the flipper 122 being biased in the "lock" position (counter-clockwise as viewed in the figure) by spring 126. As the cam 128 rotates, the flipper 122 is actuated by an extending cam surface 128a (there is an extending cam surface 128a on each side of the cam 128) for releasing a film loop 130 to travel down pathway 134 and past the aperture 135 driven by the air from blower 132 thereby advancing the film. The passage of one loop 130 advances the film one frame. Register pins 148 keep the film in proper alignment as described in previous embodiments. The flow of air from the blower 132 is directed by a series of curved vanes 142, 143. The path for the flow of air is generally illustrated by the arrows in the figure. The vanes 142, 143 direct the flow of air passing therebetween in a direction parallel to the surface of the film loop 130. A smaller portion of the air flow is allowed to pass beneath the vane 142 to impinge directly on the film loop 130. It is believed that this configuration provides for smooth film movement by creating a laminar flow of air over the film to control a positive loop release.

The film tension on the input sprocket 114 is maintained by a roller 114A and the film tension on the output sprocket is maintained by a roller 120A. Film 112 is provided to the input roller 114A from a take-off spool 105 (shown diagrammatically) and taken in from roller 120A by take-up spool 106 (shown diagrammatically). Sprocket teeth 116 on both the input sprocket 114 and the output sprocket 120 mesh with perforated openings paired at regular intervals along the length of the film 130.

A scoop 138 is positioned at the end of the pathway 134 to provide a soft landing of the film loop 130. It is believed that the softer landing will allow for reduced wear on the film (e.g., longer life of film splices) or may eliminate or reduce the need for reverse air pressure for some types of film.

To increase air pressure in the exit from output sprocket 120, a bracket 139 with a lip 139A is provided to form a narrow air gap 140 between the lip 139A and the output sprocket 120. The increase in pressure holds the film 112 firmly on the teeth 116 of the output sprocket 120. The size of the gap 140 may be adjusted by moving the position of the bracket 139. The other elements and features are as described in previous embodiments and are not repeated.

FIGS. 9–13 illustrate another embodiment including adjustment features providing for fine tuning of film registration such as may be employed in the previous embodiments. The gate 246 in this embodiment spans between respective input and output sprockets (not shown in this embodiment, but similarly as the embodiment as shown in FIGS. 1–4). The gate 246 is primarily secured in place by main bolts 260, 264. The gate 246 includes first and second register brackets 240, 340 each having a row of register pins 248, 348 arranged in a linear fashion along the gate 246 so that pairs of register pins 248, 348 engage the paired perforated openings on opposite sides of the film thereby securing the film over the projection aperture 250. As shown in FIGS. 9 and 11–13, some register pins 249 on the register bracket 240 have a wider transverse dimension than other pins 248 to reduce unwanted sideways motion of the film that causes unwanted flutter of the projected picture.

The register brackets 240, 340 are held in place by support brackets 250, 350. The support bracket 250 is secured to the gate body 247 by fasteners (shown as screws or bolts 252, 254, 256, 258) which when tightened, lock the register bracket 240 in position therebetween. Similarly, the support bracket 350 is secured to the gate body 246a by fasteners (shown as screws or bolts 352, 354, 356, 358) which when tightened, lock the register bracket 340 in position therebetween.

In this embodiment, the gate 246 allows for positional adjustment of the register bracket 240 for fine tuned positioning of the register pins 248, 249. The register bracket 240 has oblong holes 242, 244 through which the main bolts 260, 264 may pass but also allow for transverse position adjustment of the register bracket 240 relative to the support bracket 250. An adjustment hole 245 accepts an adjustment tool 200 which comprises a handle portion 202, a rounded end portion 204 and a rounded tip 206.

As may be seen in FIG. 9 by comparing the relative positions of the holes 245, 255, the position of the register bracket 240 is centered relative to the support bracket. In order to adjust the position of the register bracket 240, the screws 252, 254, 256, 258 are loosened. The tool 200 is inserted through a hole 255 in the support bracket 250 with the rounded end portion 204 seating in the hole 245 of the register bracket and the rounded tip 206 seating in a hole within the gate body 247. The tool 200 may be pivoted in any direction so as to engage the rounded end portion 204 against the sides of the hole 245 thereby adjusting the relative position of the register bracket 240. FIG. 11 indicates that the register bracket 240 has been moved in the direction of the arrow 205 (i.e. to the right as viewed in the figure). It is noted that the diameters of the holes 252a, 254a, 256a, 258a are slightly larger than the diameters of respective screws 252, 254, 256, 258 to permit such adjustment. Once the register bracket 240 is fine tuned to the desired position, the screws 252, 254, 256, 258 are tightened to lock the register bracket 240 in place.

FIGS. 9–11 also illustrate the gate 246 having a pair of curved film line lands 251 disposed on opposite sides of the aperture 250. The film line lands provide support for the film on opposite sides of the aperture 250, engaging the film only at the film lines, where there is of course no image. The film line lands 251, 251 are narrow, on the order of ⅟₃₂ inches, with a slightly curved surface where it engages with the film. This curvature is intended to better support and steady the film by providing a slight stiffening to the film, in similar fashion as experienced by a steel tape measure. The radius of curvature of the curved contacting surface of the film line lands varies according to film format, but is usually at least about 20 inches, producing a curve in the film small enough so as to not adversely affect imaging. Since the motion of the loop (see e.g. loop 130 in the embodiment of FIG. 8) produces only a rolling contact with the lands 251, 251 minimizing wear on the film.

FIGS. 14–18 illustrate another alternative embodiment which enables adjustment of the air pressure in the exit from output sprocket 320. Similar to previous embodiments, a scoop 438 is positioned at the end of the pathway 434 to provide a soft landing of the film loop. It is believed that the softer landing will allow for reduced wear on the film (e.g., longer life of film splices) or may eliminate or reduce the need for reverse air pressure for some types of film.

A bracket 439 with a lip 439A is provided to form the narrow air gap 440 over the film between the lip 439A and the output sprocket 420. The increase in pressure is intended to hold the film firmly on the teeth 416 of the output sprocket 420. Film tension on the output sprocket 420 is maintained by a roller 420A. The size of the gap 440 in this embodiment is readily adjusted by moving the position of the angle bracket 450. The other elements and features are as described in previous embodiments and are not repeated.

An adjusting screw 460 (see FIG. 14) has a head portion 462, a main barrel portion 463 passing through the bracket 439 and a threaded end portion 464 passing through the angle bracket 450. By manually turning the head portion 462, the position of the angle bracket 450 (the angle bracket having female threads which engage the threaded end 464) may be adjusted. Springs 472, 474 are positioned between the angle bracket 450 and the bracket 439 to bias the angle bracket 450 into the gap 440. A slip ring 466 is secured on the end of the threaded portion to ensure that the angle bracket 450 is not turned too far so as to fall off the threaded portion 464.

The mechanisms which have been described in detail above have been illustrated as being incorporated into a film projector, but the mechanisms may be used for other apparatus employing a film advance mechanism such as for example a motion picture camera, a still frame picture camera, or film splicing mechanism.

Thus, embodiments of a film advance mechanism have been shown and described. Though certain examples and advantages have been disclosed, further advantages and modifications may become apparent to one skilled in the art from the disclosures herein. The invention therefore is not to be limited except in the spirit of the claims that follow.

What is claimed is:

1. A film advance mechanism comprising film input mechanism for moving film along a path past an aperture;

film take-up mechanism taking up film having passed the aperture;

first and second rows of register pins arranged in linear fashion along opposite edges of the path between the film input mechanism and the film take-up mechanism for engaging perforated openings on the film;

means for providing fine tuned position adjustment of the first row of register pins relative to the second row of register pins.

2. A film advance mechanism according to claim 1 further comprising first and second support brackets disposed on opposite sides of the aperture, wherein the first row of register pins are formed on a first register bracket, the first register bracket being secured to the first support bracket by fasteners, the fasteners being loosened to allow position adjustment of the first register bracket relative to the first support bracket comprising said means for providing fine tuned position adjustment.

3. A film advance mechanism according to claim 1 wherein the film is formed into a loop with the loop propelled past the aperture by a flow of air, the film being advanced one frame for each successive loop propelled past the aperture.

4. A film advance mechanism according to claim 1 further comprises an air pressure source which provides a constant flow of air onto the loop of the film as the loop of film is formed to propel the loop of film past the aperture.

5. A film advance mechanism according to claim 1 further comprising curved film line lands on opposite edges of the aperture.

6. A film advance mechanism according to claim 1 further comprising means for adjusting the size of an air gap over the film on the film take-up mechanism.

7. A method for advancing film in a motion picture device such as a camera or projector, comprising:

providing a take-off spool to supply film;

forming a loop in the film at an entrance to an aperture position;

blowing the loop across the aperture position and toward a film take-up spool;

releasing successive loops of film to be blown across the aperture position;

keeping the film in proper alignment as the successive loops of film are advanced past the aperture comprising:

aligning the film as the film is moved across the aperture by engaging perforations in the film with first and second rows of register pins arranged in linear fashion between the take-off spool and the take-up spool, adjusting linear position of the first row of register pins.

8. A method according to claim 7 further comprising advancing the film one frame for each passage of a loop across the aperture position to the take-up spool and releasing successive loops at a rate to advance the film at a speed corresponding to frame speed of the motion picture device.

* * * * *

UNITED STATES PATENT AND TRADEMARK OFFICE
CERTIFICATE OF CORRECTION

PATENT NO. : 5,841,514
DATED : November 24, 1998
INVENTOR(S) : Leland R. Schmidt It is certified that error appears in the above-identified patent and that said Letters Patent is hereby corrected as shown below:

Column 1, line 6, replace "August 23, 1995 now Pat. No. 56336096 which" with -- August 23, 1995 now Pat. No.5,633,696, which --.

Signed and Sealed this

Twenty-third Day of November, 1999

Attest:

Q. TODD DICKINSON

*Attesting Officer*        *Acting Commissioner of Patents and Trademarks*